(12) United States Patent
Hammi et al.

(10) Patent No.: US 7,205,066 B1
(45) Date of Patent: *Apr. 17, 2007

(54) STRUCTURAL ELEMENT WITH RIB-RECEIVING MEMBER

(75) Inventors: Basil Hammi, El Cajon, CA (US); Claude Hubert, Riverside, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/154,178

(22) Filed: May 23, 2002

(51) Int. Cl.
*B32B 7/00* (2006.01)
(52) U.S. Cl. ............... 429/119; 428/120; 428/163; 428/167; 428/33; 428/53; 428/133; 428/137; 244/131; 244/123
(58) Field of Classification Search ............... 428/163, 428/167, 33, 53, 119, 120, 133, 137; 244/123, 244/131
See application file for complete search history.

(56) References Cited

U.S. PATENT DOCUMENTS 4,177,306 A * 12/1979 Schulz et al. ............... 428/107

(Continued)

FOREIGN PATENT DOCUMENTS

EP 0227107 7/1986

OTHER PUBLICATIONS

"Composite Grid-Lock® Pre-Implementation Program" paper presented to U.S. Air Force Research Laboratory Flight Dynamics Directorate (Jan. 2001).

(Continued)

*Primary Examiner*—Patrick Joseph Ryan
*Assistant Examiner*—Jane Rhee
(74) *Attorney, Agent, or Firm*—Goodwin Procter LLP

(57) ABSTRACT

A structural element for use in aerospace applications such as a structural element suitable as an aircraft component is described. In one embodiment of the invention, the composite structure comprises: (a) at least one member having an inner surface and an outer surface; (b) a rib having a first end and a second end; (c) a rib-receiving member integral to the inner surface of the at least one member, wherein the rib-receiving member comprises a plurality of rib-receiving elements and openings therein for receiving the first end of the rib and at least one cover sheet having an opening therein for receiving the first end of the rib; and (d) at least one anchoring element interconnecting the rib-receiving elements. In another embodiment of the invention, the composite structure comprises: (a) at least one member having an inner surface and an outer surface; (b) a rib having a first end and a second end; and (c) a rib-receiving member integral to the inner surface of the at least one member, wherein the rib-receiving member comprises a rib-receiving sleeve having an open end for receiving the rib and a closed end, and two sleeve support members, wherein the sleeve support members are disposed on opposite sides of the sleeve and interconnect the sleeve to the inner face of the at least one member.

26 Claims, 7 Drawing Sheets

U.S. PATENT DOCUMENTS

| | | | | |
|---|---|---|---|---|
| 5,273,806 A | | 12/1993 | Lockshaw et al. | 428/167 |
| 5,476,704 A | * | 12/1995 | Kohler | 428/119 |
| 5,487,930 A | | 1/1996 | Lockshaw et al. | 428/53 |
| 5,508,085 A | | 4/1996 | Lockshaw et al. | 428/178 |
| 5,580,622 A | | 12/1996 | Lockshaw et al. | 428/34.1 |
| 5,616,376 A | * | 4/1997 | Lockshaw et al. | 428/33 |
| 5,633,053 A | | 5/1997 | Lockshaw et al. | 428/33 |
| 5,688,426 A | * | 11/1997 | Kirkwood et al. | 219/633 |
| 5,849,393 A | | 12/1998 | Slattery | 428/172 |
| 6,374,570 B1 | | 4/2002 | McKague, Jr. | 52/762 |
| 6,520,706 B1 | * | 2/2003 | McKague et al. | 403/265 |

OTHER PUBLICATIONS

U.S. Appl. No. 10/154,207, filed May 23, 2002, by John E. Meaney and David A. Peterson for "Structural Element With Rib-Receiving Member".

F-16 Horizontal Tail and Edges Sustainment dated Nov. 3, 2000.

* cited by examiner

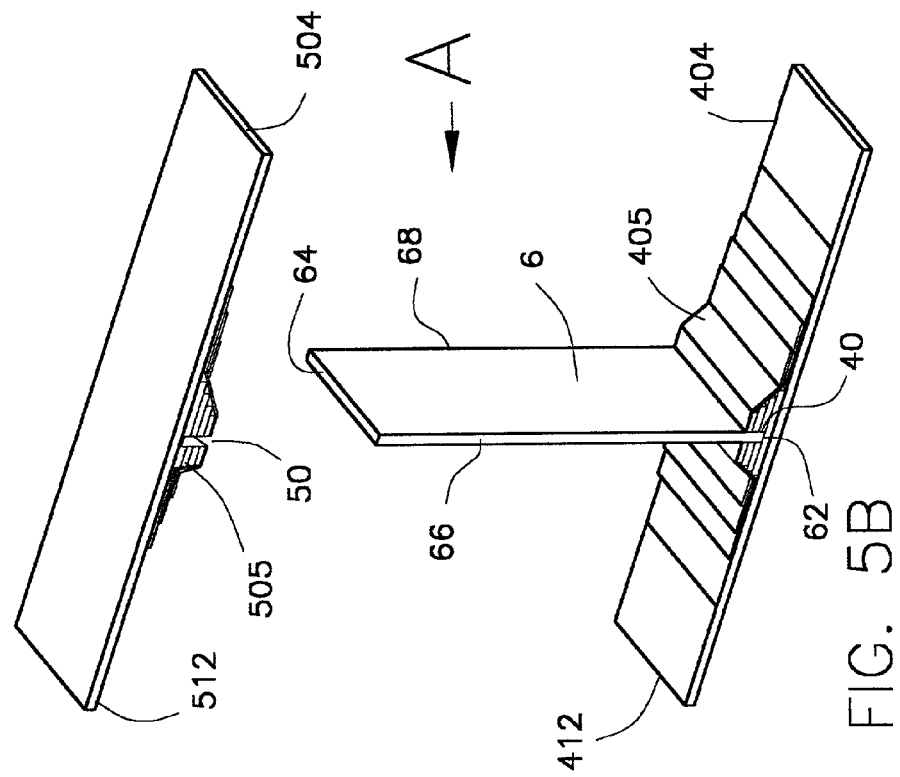
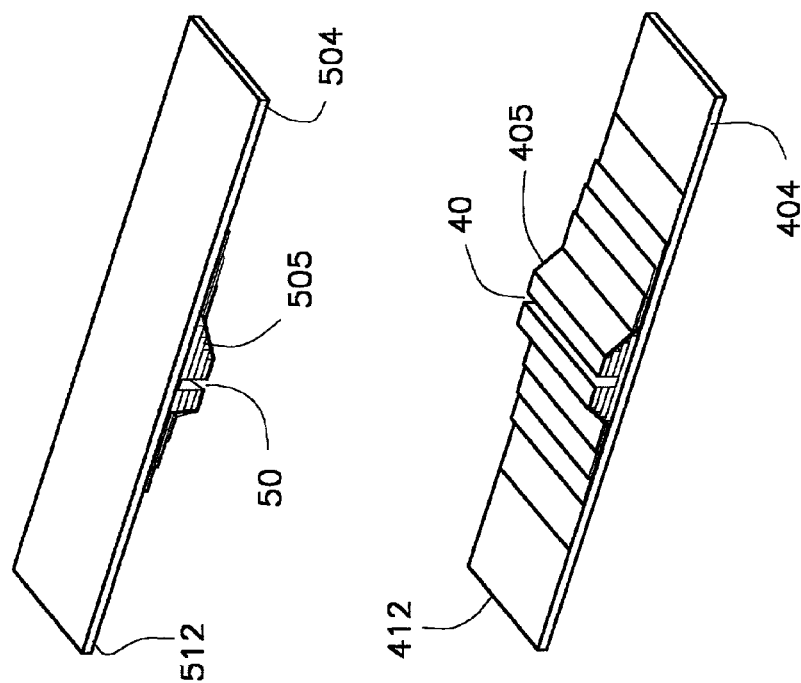
FIG. 5B
FIG. 5A

STRUCTURAL ELEMENT WITH RIB-RECEIVING MEMBER

BACKGROUND OF THE INVENTION

1. Field of the Invention

This invention relates to a structural element useful in aerospace applications, as well as a method of preparing such a structural element for use in aerospace applications, such as a structural element suitable as an aircraft component. In particular, in the present invention the structural element comprises a first member such as a face sheet, and at least one rib-receiving member integral to the first member, wherein the rib-receiving member comprises either: (i) a plurality of rib-receiving elements for receiving the rib member with at least one anchoring element interconnecting the rib-receiving elements; or (ii) a rib-receiving sleeve for receiving the rib member.

2. Background Information

Aircraft components including intake ducts, flooring and wing sections are often made of honeycomb material which is lightweight, rigid and capable of being fabricated in many shapes. Depending on the particular application, the use of such honeycomb material may be expensive, in terms of life cycle costs, and may require extensive maintenance and repair. In some circumstances, it is also not readily adaptable to the attachment of other components. This drawback may be overcome by reinforcing elements within the honeycomb, but this typically involves adding to the weight of the structural element and thus reducing the advantage of the low weight of the honeycomb material.

Furthermore, honeycomb core structures suffer from susceptibility to moisture intrusion resulting from their open-cell construction. Even non-visible face sheet damage can create a path for moisture intrusion. When moisture condenses on the outside of an aircraft wing skin fabricated with honeycomb core panels, the pressure differential between the sandwich interior and the atmosphere during descent can force moisture into the honeycomb core. Repeated freeze/thaw cycles are also known to cause corrosion of aluminum honeycomb cores, and delamination of the face sheet from the core. Repair complications due to honeycomb core water intrusion represent an additional difficulty.

Other problems with honeycomb core structures are the presence of undetected damage, cracked skins, poor radar transparency due to the metal foil and poor thermal insulation due to the conductivity of aluminum foil which is often a component of honeycomb structures.

In U.S. Pat. Nos. 5,273,806, 5,487,930, and 5,508,085, structural elements are disclosed which comprise two outer structures and an inner structure interposed between the two outer structures. The inner structure includes lateral and longitudinal ribs. The ribs may be bonded to the outer structures. Alternatively, the structures may be joined together by interlocking ribs and grooves. The grooves are typically formed on the inner surfaces of the outer structures to mate with the ribs of the inner structures. While the inner structures may be formed from metal or composite material, the outer structures are generally formed from metal with grooves machined into the metal structures. As a result, since the metal is typically more dense and less stiff than the composite material, the overall weight of the structural element increases while its stiffness is reduced.

SUMMARY OF THE INVENTION

Accordingly, it is an object of this invention to provide a structural element comprising:

(a) a rib member having a first end and a second end;
(b) a first member having an inner surface and an outer surface;
(c) a rib-receiving member integral to the inner surface of the first member, wherein the rib-receiving member comprises a plurality of rib-receiving elements having openings therein for receiving the first end of the rib member and at least one cover sheet having an opening therein for receiving the first end of the rib member, and at least one anchoring element interconnecting the rib-receiving elements.

It is another object of this invention to provide a structural element comprising:

(a) a rib member having a first end and a second end;
(b) a first member having an inner surface and an outer surface;
(c) a first rib-receiving member integral to the inner surface of the first member, wherein the first rib-receiving member comprises a plurality of rib-receiving elements having openings therein for receiving the first end of the rib member and at least one cover sheet having an opening therein for receiving the first end of the rib member, and at least one anchoring element interconnecting the rib-receiving elements.
(d) a second member having an inner surface and an outer surface; and
(e) a second rib-receiving member integral to the inner surface of the second member, wherein the second rib-receiving member comprises a plurality of rib-receiving elements having openings therein for receiving the second end of the rib member and at least one cover sheet having an opening therein for receiving the second end of the rib member, and at least one anchoring element interconnecting the rib-receiving elements.

It is another object of this invention to provide a structural element comprising:

(a) a rib member having a first end and a second end;
(b) a first member having an inner surface and an outer surface;
(c) a first rib-receiving member integral to the inner surface of the first member, wherein the first rib-receiving member comprises a plurality of rib-receiving elements having openings therein for receiving the first end of the rib member and at least one cover sheet having an opening therein for receiving the first end of the rib member, and at least one anchoring element interconnecting the rib-receiving elements;
(d) a second member having an inner surface and an outer surface;
(e) a second rib-receiving member integral to the inner surface of the second member, wherein the second rib-receiving member comprises a plurality of rib-receiving elements having openings therein for receiving the second end of the rib member and at least one cover sheet having an opening therein for receiving the second end of the rib member, and at least one anchoring element interconnecting the rib-receiving elements, and at least one anchoring element interconnecting the rib-receiving elements;
(f) a third member having an inner surface and an outer surface;
(g) a third rib-receiving member integral to the inner surface of the third member, wherein the third rib-receiving member comprises a plurality of rib-receiving elements having openings therein for receiving the first edge of the rib member and at least one cover sheet having an opening therein for receiving the first edge of the rib member, and at least one anchoring element interconnecting the rib-receiving elements;

(h) a fourth member having an inner surface and an outer surface; and (i) a fourth rib-receiving member integral to the inner surface of the fourth member, wherein the fourth rib-receiving member comprises a plurality of rib-receiving elements having openings therein for receiving the second edge of the rib member and at least one cover sheet having an opening therein for receiving the second edge of the rib member, and at least one anchoring element interconnecting the rib-receiving elements.

It is another object of the present invention to provide a method of preparation of the structural element of the invention, wherein the method comprises:

(a) providing a rib member having a first end and a second end;

(b) providing a first member having an inner surface and an outer surface;

(c) engaging the first end of the rib member to a rib-receiving member engaged to the inner surface of the first member, wherein the rib-receiving member comprises a plurality of rib-receiving elements having openings therein which receive the first end of the rib member and at least one cover sheet having an opening therein which receives the first end of the rib member; and (d) interconnecting the rib-receiving elements by providing at least one anchoring element which is connectively engaged to the rib-receiving elements.

It is another object of this invention to provide a method for forming a structural element comprising:

(a) providing a rib member having a first end and a second end;

(b) providing a first member having an inner surface and an outer surface;

(c) engaging a first rib-receiving member to the inner surface of the first member, wherein the first rib-receiving member comprises a plurality of rib-receiving elements having openings therein for receiving the first end of the rib member and at least one cover sheet having an opening therein for receiving the first end of the rib member;

(d) interconnecting the rib-receiving elements of the first rib-receiving member by providing at least one anchoring element which is connectively engaged to the rib-receiving element;

(e) providing a second member having an inner surface and an outer surface;

(f) engaging a second rib-receiving member integral to the inner surface of the second member, wherein the second rib-receiving member comprises a plurality of rib-receiving elements having openings therein for receiving the second end of the rib member and at least one cover sheet having an opening therein for receiving the second end of the rib member; and (g) interconnecting the rib-receiving elements of the second rib-receiving member by providing at least one anchoring element which is connectively engaged to the rib-receiving element.

It is another object of this invention to provide a method for forming a structural element comprising:

(a) providing a rib member having a first end and a second end;

(b) providing a first member having an inner surface and an outer surface;

(c) engaging a first rib-receiving member to the inner surface of the first member, wherein the first rib-receiving member comprises a plurality of rib-receiving elements having openings therein for receiving the first end of the rib member and at least one cover sheet having a groove therein which receives the first end of the rib member;

(d) interconnecting the rib-receiving elements of the first rib-receiving member by providing at least one anchoring element which is connectively engaged to the rib-receiving element;

(e) providing a second member having an inner surface and an outer surface;

(f) engaging a second rib-receiving member integral to the inner surface of the second member, wherein the second rib-receiving member comprises a plurality of rib-receiving elements having openings therein for receiving the second end of the rib member and at least one cover sheet having an opening therein for receiving the second end of the rib member;

(g) interconnecting the rib-receiving elements of the second rib-receiving member by providing at least one anchoring element which is connectively engaged to the rib-receiving element;

(h) providing a third member having an inner surface and an outer surface;

(i) engaging a third rib-receiving member integral to the inner surface of the third member, wherein the third rib-receiving member comprises a plurality of rib-receiving elements having openings therein for receiving the first edge of the rib member and at least one cover sheet having an opening therein for receiving the first edge of the rib member;

(j) interconnecting the rib-receiving elements of the third rib-receiving member by providing at least one anchoring element which is connectively engaged to the rib-receiving element;

(k) providing a fourth member having an inner surface and an outer surface;

(l) engaging a fourth rib-receiving member integral to the inner surface of the fourth member, wherein the fourth rib-receiving member comprises a plurality of rib-receiving elements having openings therein for receiving the second edge of the rib member and at least one cover sheet having an opening therein for receiving the second edge of the rib member; and (m) interconnecting the rib-receiving elements of the fourth rib-receiving member by providing at least one anchoring element which is connectively engaged to the rib-receiving element.

It is another object of this invention to provide a structural element comprising:

(a) a rib member having a first end and a second end;

(b) a first member having an inner surface and an outer surface; and (c) a rib-receiving member integral to the inner surface of the first member, wherein the rib-receiving member comprises a rib-receiving sleeve having an open end for receiving the rib member and a closed end, a first sleeve support member and a second sleeve support member, wherein the first and second sleeve support members interconnect the rib-receiving sleeve to the inner face of the first member.

It is another object of this invention to provide a structural element comprising:

(a) a rib member having a first end and a second end;
(b) a first member having an inner surface and an outer surface;
(c) a first rib-receiving member integral to the inner surface of the first member, wherein the first rib-receiving member comprises a first rib-receiving sleeve having an open end for receiving the rib member and a closed end and two sleeve support members, wherein the sleeve support members are disposed on opposite sides of the first rib-receiving sleeve and interconnect the first rib-receiving sleeve to the inner face of the first member;
(d) a second member having an inner surface and an outer surface; and
(e) a second rib-receiving member integral to the inner surface of the second member, wherein the second rib-receiving member comprises a second rib-receiving sleeve having an open end for receiving the rib member and a closed end, and two sleeve support members, wherein the sleeve support members are disposed on opposite sides of the second rib-receiving sleeve and interconnect the second rib-receiving sleeve to the inner face of the second member.

It is another object of this invention to provide a structural element comprising:
(a) a rib member having a first end and a second end;
(b) a first member having an inner surface and an outer surface;
(c) a first rib-receiving member integral to the inner surface of the first member, wherein the first rib-receiving member comprises a first rib-receiving sleeve having an open end for receiving the rib member and a closed end, and two sleeve support members, wherein the sleeve support members are disposed on opposite sides of the first rib-receiving sleeve and interconnect the first rib-receiving sleeve to the inner face of the first member;
(d) a second member having an inner surface and an outer surface;
(e) a second rib-receiving member integral to the inner surface of the second member, wherein the second rib-receiving member comprises a second rib-receiving sleeve having an open end for receiving the rib member and a closed end, and two sleeve support members, wherein the sleeve support members are disposed on opposite sides of the second rib-receiving sleeve and interconnect the second rib-receiving sleeve to the inner face of the second member;
(f) a third member having an inner surface and an outer surface;
(g) a third rib-receiving member integral to the inner surface of the third member, wherein the third rib-receiving member comprises a third rib-receiving sleeve having an open end for receiving the rib member and a closed end, and two sleeve support members, wherein the sleeve support members are disposed on opposite sides of the third rib-receiving sleeve and interconnect the third rib-receiving sleeve to the inner face of the third member;
(h) a fourth member having an inner surface and an outer surface; and
(i) a fourth rib-receiving member integral to the inner surface of the fourth member, wherein the fourth rib-receiving member comprises a fourth rib-receiving sleeve having an open end for receiving the rib member and a closed end, and two sleeve support members, wherein the sleeve support members are disposed on opposite sides of the fourth rib-receiving sleeve and interconnect the fourth rib-receiving sleeve to the inner face of the fourth member.

It is another object of the present invention to provide a method of preparation of the structural element of the invention, the method comprising:
(a) providing a rib member having a first end and a second end;
(b) providing a first member having an inner surface and an outer surface; and
(c) engaging the first end of the rib member to a rib-receiving member integral to the inner surface of the first member, wherein the rib-receiving member comprises a rib-receiving sleeve having an open first end for receiving the rib member and a closed second end, a first sleeve support member and a second sleeve support member wherein the first and second sleeve support members interconnect the sleeve to the inner face of the first member.

It is another object of this invention to provide a method for forming a structural element comprising:
(a) providing a rib member having a first end and a second end;
(b) providing a first member having an inner surface and an outer surface;
(c) engaging a first rib-receiving member to the inner surface of the first member, wherein the first rib-receiving member comprises a first rib-receiving sleeve having an open end for receiving the rib member and a closed end, and two sleeve support members, wherein the sleeve support members are disposed on opposite sides of the first rib-receiving sleeve and interconnect the first rib-receiving sleeve to the inner face of the first member;
(d) providing a second member having an inner surface and an outer surface; and
(e) engaging a second rib-receiving member integral to the inner surface of the second member, wherein the second rib-receiving member comprises a second rib-receiving sleeve having an open end for receiving the rib member and a closed end, and two sleeve support members, wherein the sleeve support members are disposed on opposite sides of the second rib-receiving sleeve and interconnect the second rib-receiving sleeve to the inner face of the second member.

It is another object of this invention to provide a method for forming a structural element comprising:
(a) providing a rib member having a first end and a second end;
(b) providing a first member having an inner surface and an outer surface;
(c) engaging a first rib-receiving member to the inner surface of the first member, wherein the first rib-receiving member comprises a first rib-receiving sleeve having an open end for receiving the rib member and a closed end, and two sleeve support members, wherein the sleeve support members are disposed on opposite sides of the first rib-receiving sleeve and interconnect the first rib-receiving sleeve to the inner face of the first member;
(d) providing a second member having an inner surface and an outer surface;
(e) engaging a second rib-receiving member integral to the inner surface of the second member, wherein the second rib-receiving member comprises a second rib-receiving sleeve having an open end for receiving the rib member and a closed end, and two sleeve support members, wherein the sleeve support members are disposed on opposite sides of the second rib-receiving sleeve and interconnect the second rib-receiving sleeve to the inner face of the second member;

(f) providing a third member having an inner surface and an outer surface;

(g) engaging a third rib-receiving member integral to the inner surface of the third member, wherein the third rib-receiving member comprises a third rib-receiving sleeve having an open end for receiving the rib member and a closed end, and two sleeve support members, wherein the sleeve support members are disposed on opposite sides of the third rib-receiving sleeve and interconnect the third rib-receiving sleeve to the inner face of the third member;

(h) providing a fourth member having an inner surface and an outer surface; and (i) engaging a fourth rib-receiving member integral to the inner surface of the fourth member, wherein the fourth rib-receiving member comprises a fourth rib-receiving sleeve having an open end for receiving the rib member and a closed end, and two sleeve support members, wherein the sleeve support members are disposed on opposite sides of the fourth rib-receiving sleeve and interconnect the fourth rib-receiving sleeve to the inner face of the fourth member.

The structural element according to the present invention permits the elimination of extensive assembly tooling and reduced part count. The structural element of this invention also provides high strength, low weight, and improved stiffness.

Unlike honeycomb structures, the structural element of this invention does not comprise small cellular areas that can trap moisture. In fact, the structure lends itself to direct venting and drainage systems to eliminate the accumulation of moisture. In addition, the structure does not have dissimilar metallic materials in the construction that can lead to galvanic corrosion.

The structure's durability is also enhanced by several features. The bonded joint is loaded in double shear and hence reduces any tendency for peel stresses. The rib-receiving member (also known as a "build-up") provides a reinforced area for receiving any impact loads directly imparted to the rib member.

BRIEF DESCRIPTION OF THE DRAWINGS

FIGS. 5A and 5B show a structure formed by engaging a rib member with two rib-receiving members.

DETAILED DESCRIPTION OF THE INVENTION

Figure 1:
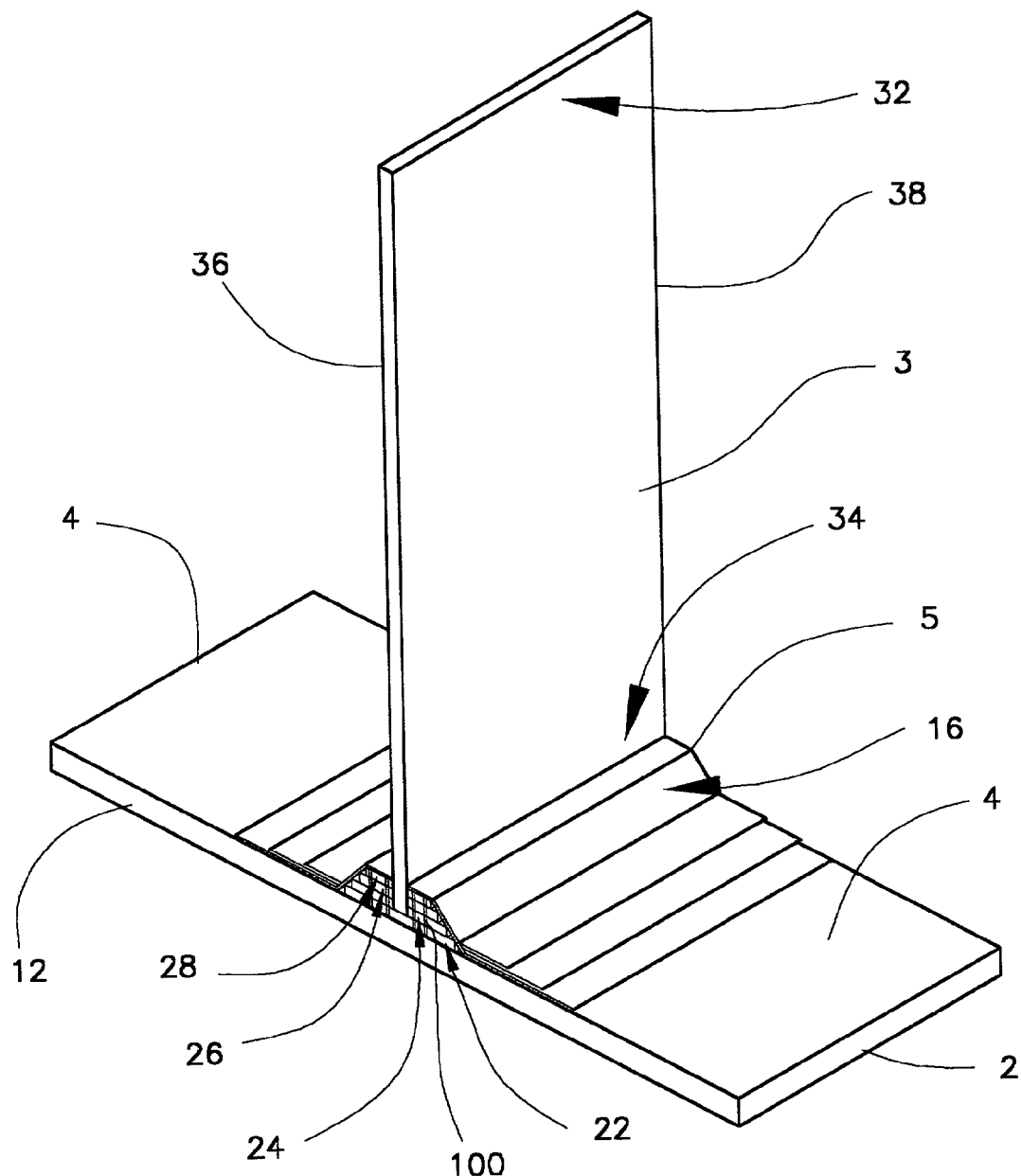
FIG. 1 shows the assembled structural element of one embodiment of this invention.

Various embodiments of this invention are illustrated by reference to FIGS. 1–4 herein. FIG. 1 shows the assembled structural element of one embodiment of this invention. The composite structure comprises: a first member or face sheet 12 having an inner surface 4 and an outer surface 2; a rib-receiving member 5; a rib member 3 having a first end 34, a second end 32, a first edge 36 and a second edge 38. The first member may be, for example, a face sheet which is employed in an aerospace structure such as an aircraft wing or an internal aerospace structure such as a strut or the like. The first member may be fabricated from metal or a composite material, but is preferably fabricated from a composite material, as is further described herein. A second member (not shown) which is similar to the first member may receive second end 32 of rib member 3 by using a second rib-receiving member, as shown, for example, in FIGS. 5A and 5B. Rib-receiving member 5 comprises at least one cover sheet 16 which has an engagement opening therein for receiving first end 34 of rib member 3. Rib-receiving member 5 additionally comprises a plurality of rib-receiving elements (shown as 22, 24, 26, and 28) also having engagement openings (e.g. grooves) therein for receiving first end 34 of rib member 3. The cover sheet or sheets and the elements of rib-receiving member 5 are preferably made from a composite material which is machinable. In another embodiment, the rib-receiving elements and cover sheets may also be fabricated from metal.

A plurality of anchoring elements 100 interconnect the rib-receiving elements. The anchoring elements 100 are preferably graphite pins known as Z-fibers™ or "Z-pins" available, for example, from Aztex, Inc., as will be understood by those skilled in the art.

In one preferred embodiment, the composite material which may be used for the rib-receiving elements, cover sheets and first member is an epoxy resin reinforced with graphite fibers. More preferably, but not necessarily, the composite material is fabricated from a toughened epoxy resin system such as 977-3 available from Cytec Fiberite and a high strength and modulus graphite fiber system such as IM-7 available from Hexcell. In addition, other composite materials which may be used include, but are not limited to, TORAYCA T700S-12K-PW/3900-2 fabric or TORAYCA T800H-/3900-2 tape (both available from Toray). These materials are particularly suitable for use because of their high structural strength and stiffness.

As depicted in FIG. 1, element 22 forms the base of the rib-receiving elements 22, 24, 26, and 28, with rib-receiving elements 24, 26, and 28 stacked sequentially upon element 22. As shown in FIG. 1, the cover sheet 16 (and additional cover sheets, if employed) are shaped to permit stacking of the rib-receiving elements 22, 24, 26, and 28 under the cover sheet or sheets. As described further herein, second end 32 of rib member 3 may also engage another rib-receiving member (not shown in FIG. 1) which is integral to a second member or face sheet (not shown in FIG. 1). In addition, first edge 36 and second edge 38 may each also be engaged to other rib-receiving members (not shown in FIG. 1) which are in turn integral to third and fourth members or face sheets (not shown in FIG. 1).

Figure 2A:
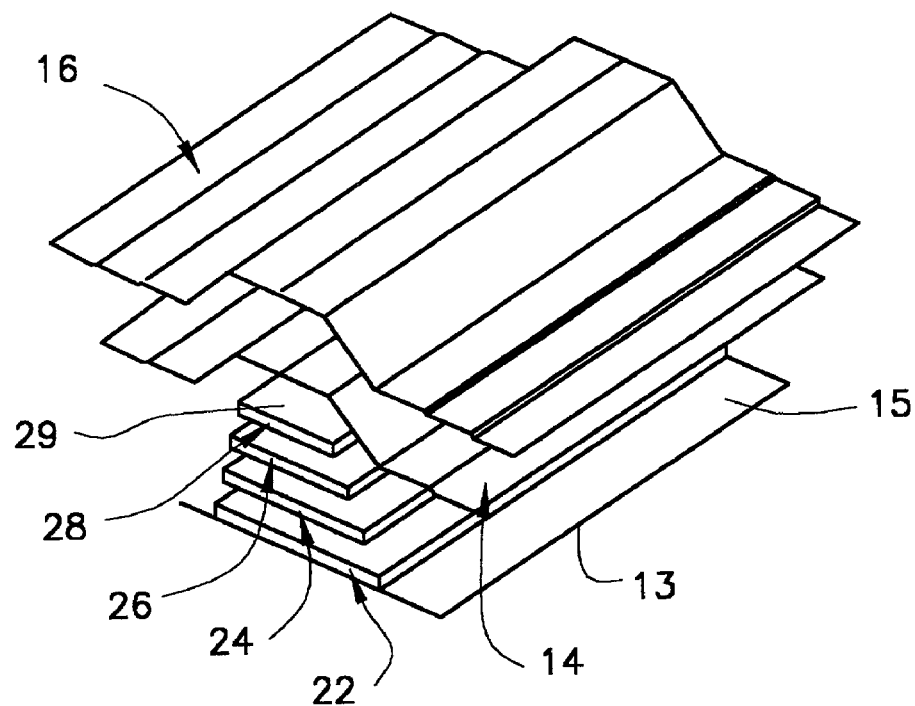
FIGS. 2A and 2B show a top view and a side view of one embodiment of the rib-receiving member.

To illustrate how the rib receiving member is constructed reference is now made to FIG. 2A. In the embodiment of FIG. 2A, cover sheets 14 and 16 are raised over rib-receiving elements 22, 24, 26, and 28 of the rib-receiving members. It will be understood that the number of and sizes of such elements employed in this invention may vary, depending upon the particular use of the structural element. These elements each have about the same thickness but progressively decreasing width, as shown (i.e. element 22 is the widest element, and element 28 is the narrowest element).

As discussed above, the rib-receiving elements may be adjoined to one another via adhesive, mechanical interconnection or other suitable means. As cover sheets 16 and 14 are raised over the elements 22, 24, 26, and 28 of the rib-receiving member, the cover sheets assume a shape which is approximately trapezoidal to minimize the spaces between cover sheet 14 and each of the elements. In this embodiment, element 22 forms the base of the rib-receiving member and resides on an optional base plate 13 which in turn resides on inner surface 4 of first member 12. The base plate 13 may also be fabricated from metal or a composite material.

Figure 2B:
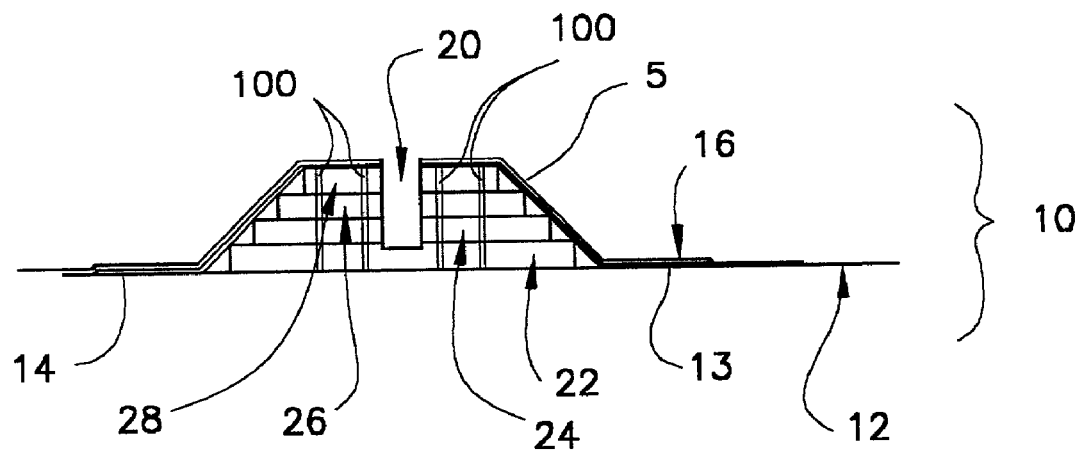

In one particularly preferred embodiment of this invention, the rib-receiving elements, base plate, first member and cover sheet or sheets are all fabricated from a composite material, and the first member, rib-receiving elements and cover sheet or sheets are arranged as depicted, for example, in FIG. 2B and cocured to form the integrated combination of first member or face sheet 12 and rib-receiving member 5 (which in this embodiment is made up of base plate 13, rib-receiving elements 22, 24, 26, and 28 having opening 20 therein, and cover sheets 14 and 16 having opening 20 therein), as depicted in FIG. 2B. As referred to herein, "cocuring" means joining two or more uncured composite layers or components (e.g. two or more rib-receiving elements or a cover sheet to a rib-receiving member, etc.) in one cure cycle to form an integrated assembly. For the graphite fiber/epoxy systems described herein which may be employed in a preferred embodiment of this invention, curing temperatures are typically in the range of 250–350° F. and the autoclave pressure is in the range of 85–100 psi held for approximately 6–7 hours, with the vacuum bag and components therein at vacuum. In other embodiments of this invention, high temperature composite systems may be employed which typically require curing temperatures in the range of 500–700° F. and pressures of 200–300 psi. As will be well understood by those skilled in the art, cocuring is typically carried out by vacuum bagging the assembly of first member or face sheet 12 and rib-receiving member 5 and placing the assembly inside an autoclave where pressure and elevated temperatures are introduced. As will be well understood by those skilled in the art, the pressure and temperatures are increased incrementally in a prescribed manner to effect a curing of the rib-receiving member and first member or face sheet into an integrated assembly. Use of cocuring to form the integrated assembly of the first member, rib-receiving elements and cover sheet or sheets advantageously avoids the necessity and expense associated with assembly tooling, which would otherwise be necessary to properly align and adjoin the first member, rib-receiving elements and cover sheet or sheets.

In another embodiment, each of rib-receiving elements 22, 24, 26 and 28 may be adjoined to one another via adhesive, mechanical interconnection or other suitable means. If an adhesive is employed, a paste adhesive such as EA 9394 available from Loctite Aerospace, FM 400 available from Cytec Fiberite or another suitable adhesive known to those skilled in the art may be used. Alternatively, rib-receiving elements 22, 24, 26 and 28 may be assisted in their load carrying capability by the resistance provided by cover sheet 16. Cover sheet 16 (or additional cover sheets, if employed) may be adjoined to inner surface 4 of first member 12 via an adhesive, mechanical interconnection or other suitable means. Base plate 13 may also be affixed to inner surface 4 of first member 12 via an adhesive, mechanical interconnection or other suitable means. The upper surface 15 of base plate 13 may also be affixed to element 22 using an adhesive, mechanical interconnection or other suitable means.

The rib-receiving elements 22, 24, 26, and 28 of the rib receiving member and cover sheets 14 and 16 of the rib-receiving member may be made from a composite or other material which may be machined, formed or otherwise shaped. Accordingly, as shown in FIG. 2B, an opening such as a groove 20 may be provided into the cover sheets 14 and 16 and into the rib-receiving elements 22, 24, 26, and 28. The groove 20 is suitably shaped and dimensioned to engage rib member 3 (as shown in FIG. 1) by aligning rib member 3 with groove 20 and inserting rib member 3 into the groove to form the composite structure shown in FIG. 1. The groove-rib engagement provides structural support between the rib-receiving member 5 and rib member 3.

Groove 20 is sized and arranged to receive rib member 3. Preferably, a film adhesive, paste adhesive or other suitable adhesive is interposed between rib member 3 and groove 20 for adhering the exterior surface of rib member 3 to the rib-receiving member comprising groove 20. The rib member 3 and the integrated rib-receiving assembly 10 (which is the combination of first member or face sheet 12 and rib-receiving member 5) are preferably not cocured together, because such cocuring would require extensive curing and assembly tooling. The present invention advantageously reduces the necessity for such tooling, which is expensive and time-consuming to use. A solder or brazing material may also be used if the components are fabricated from metallic materials.

In one preferred embodiment, rib member 3 has a rectangular shaped cross-section and preferably has a width slightly smaller than the width of the groove 20 so that the rib may be inserted into the groove while at the same time enabling the rib member 3 to be in contact with the inner surfaces of the groove by means of a joining medium (i.e. adhesive, solder or brazing material). Preferably, the rib member and groove are arranged to form an enclosure which is approximately rectangular in shape.

Anchoring elements 100 which interconnect the rib-receiving elements 22, 24, 26, and 28 and first member 12 are also shown. As previously discussed, in the embodiment of this invention in which the rib-receiving elements are made of a composite material, the anchoring elements are preferably graphite pins.

Figure 3:
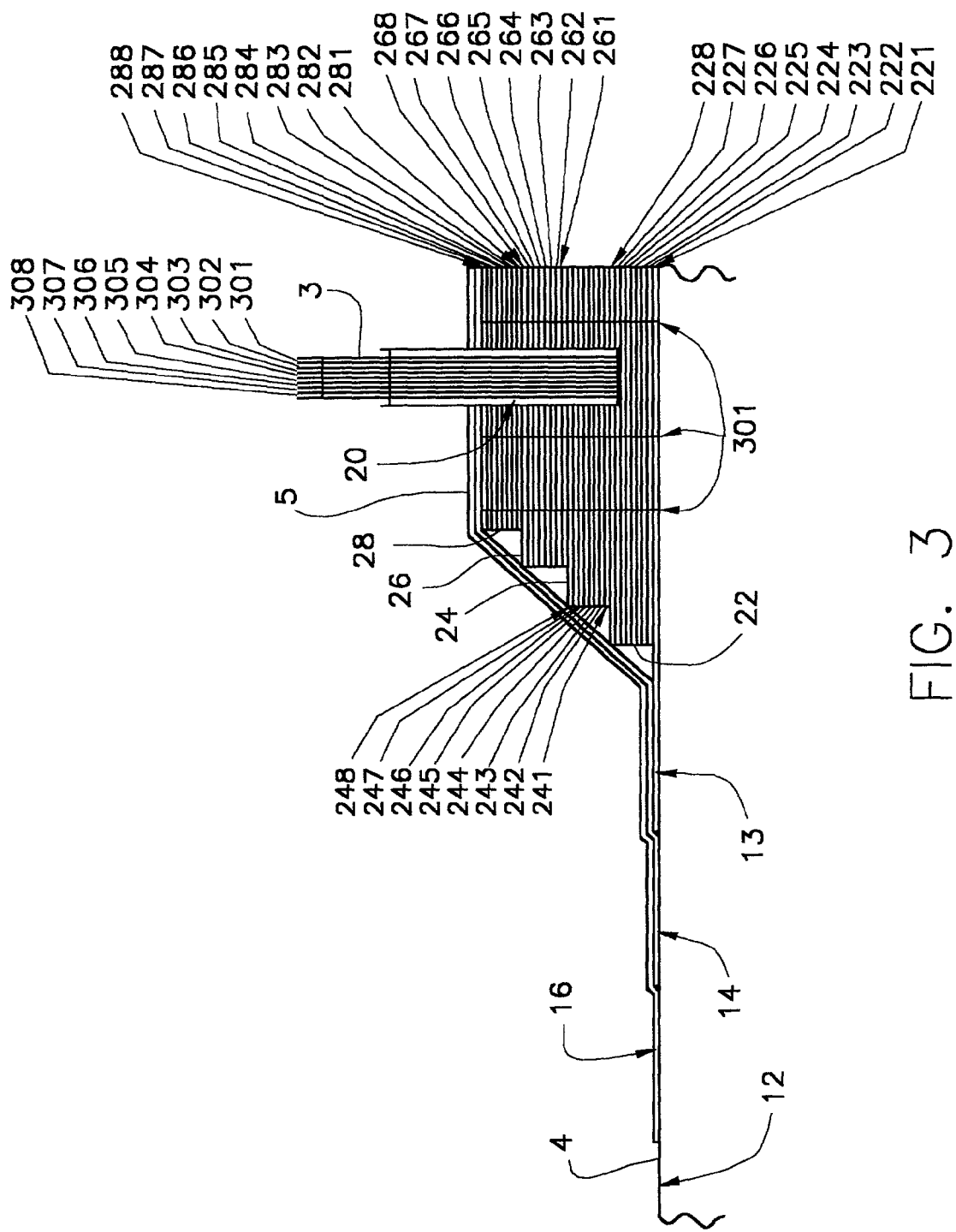
FIG. 3 shows the structural details of the members of the structural element of one embodiment of the invention.

Reference is now made to FIG. 3, which illustrates the structural details of the members of the structural element of one embodiment of the invention. As shown in FIG. 3, rib member 3 comprises a plurality of rib elements 301, 302, 303, 304, 305, 306, 307, and 308, and each of the elements 22, 24, 26 and 28 of the rib-receiving member 5 comprise a plurality of layers. In the embodiment of FIG. 3, rib-receiving member elements 22, 24, 26, and 28 respectively comprise layers 221–228, 241–248, 261–268 and 281–288, as shown. The rib elements are preferably each fabricated from a composite material such as the graphite fiber/epoxy resin system previously described, although in other embodiments the rib elements may be fabricated from metal. If the rib elements are composite materials such as the graphite fiber/epoxy resin system previously described, joining of the rib elements may be achieved by curing the individual rib elements using the curing techniques previously described with respect to the cocuring of the first member or face sheet and rib-receiving member. The rib elements, if fabricated from a composite material, should be cured to form the rib member separately from the cocuring step previously described with respect to fabrication of the integrated first member or face sheet and the rib-receiving member. Separate curing of the rib member and the integrated assembly of the first member or face sheet and the rib-receiving member is advantageous in that it avoids costly and time-consuming alignment of the rib elements with the first member, rib-receiving elements and cover sheet, and the associated tooling required for such alignment. As shown in FIG. 3, element 22 resides on base plate 13, which in turn resides on the inner face 4 of member 12. In addition, cover sheet 14 resides in part on the inner face 4 of member 12, and cover sheet 14 also resides upon, in part, the upper face of base plate 13 and also contacts each of rib-receiving elements 22, 24, 26, and 28, as shown. Cover sheet 16 resides in part on the inner face 4 of member 12. Cover sheet 16 also resides in part on the upper surface of cover sheet 14 as shown.

Anchoring elements 301 interconnect rib-receiving elements 22, 24, 26, and 28 of the rib-receiving member 5, thereby preventing peeling away of the elements of the rib-receiving member. The anchoring elements 301 do not extend into the cover plates 16 and 14.

The surfaces of all of the rib elements and rib-receiving elements are preferably smooth. The term smooth is intended to mean that the surfaces are substantially free of uneven regions which interfere with the bonding of the elements. For example, the outer surfaces of the rib-receiving elements 22, 24, 26, and 28 have no interlocking formations machined into them. However, small scale and microscopic unevenness, which is inherent in manufacturing and may even promote bonding are not excluded. Rib 3 is preferably affixed to the rib-receiving assembly using an adhesive as previously described. This advantageously avoids cocuring of the rib and rib-receiving assembly and thereby avoids the necessity for bagging and autoclave curing of the rib and rib-receiving assembly. This is advantageous because of the material and labor costs associated therewith. In this embodiment, the adhesives used may be cured at an oven temperature with moderate clamping pressure to the entire assembly. The assembly may then be ultrasonically inspected and X-rayed to ensure that proper bonding of the rib to the rib-receiving assembly is achieved.

Figure 4:
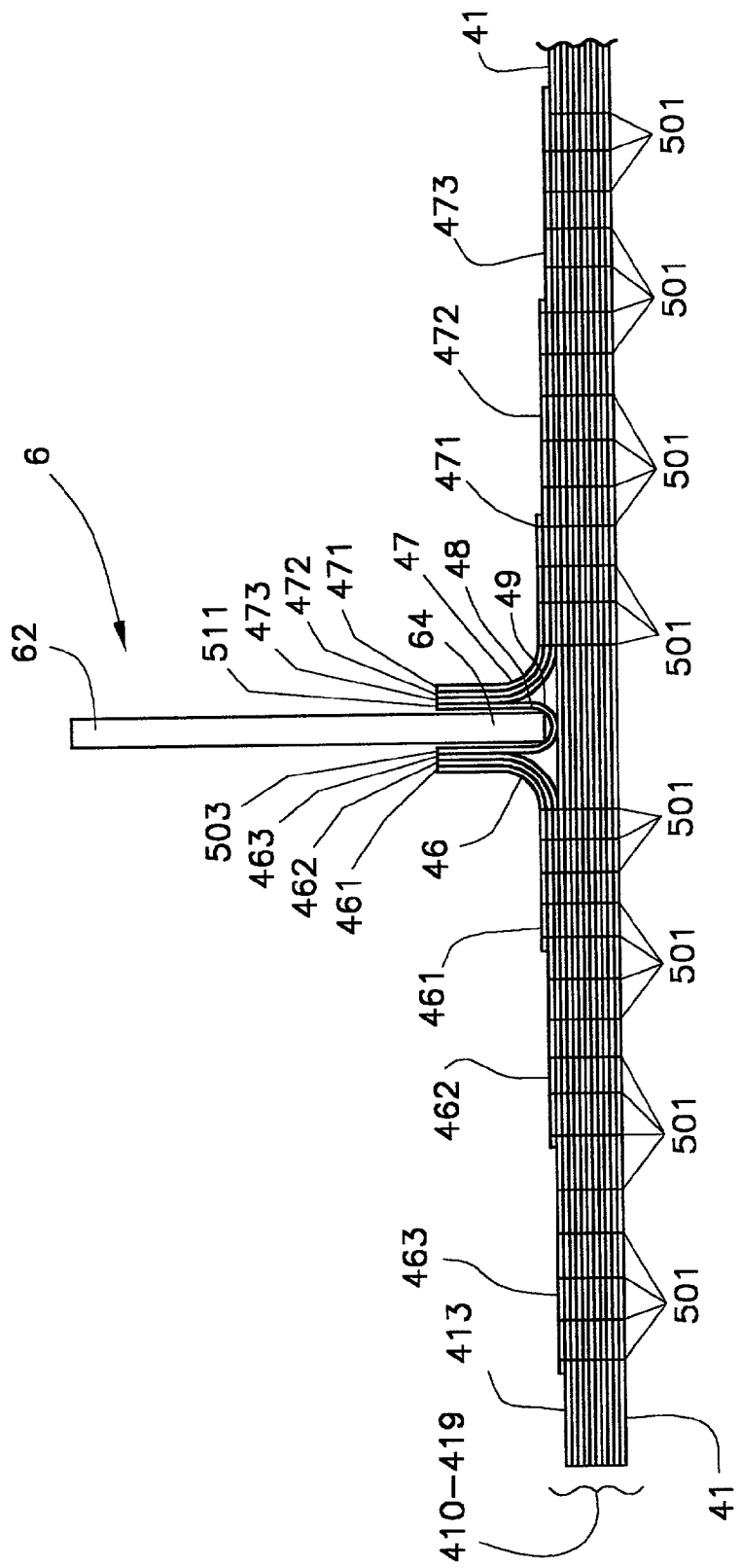
FIG. 4 shows the assembled structural element of another embodiment of this invention.
Figure 4A:
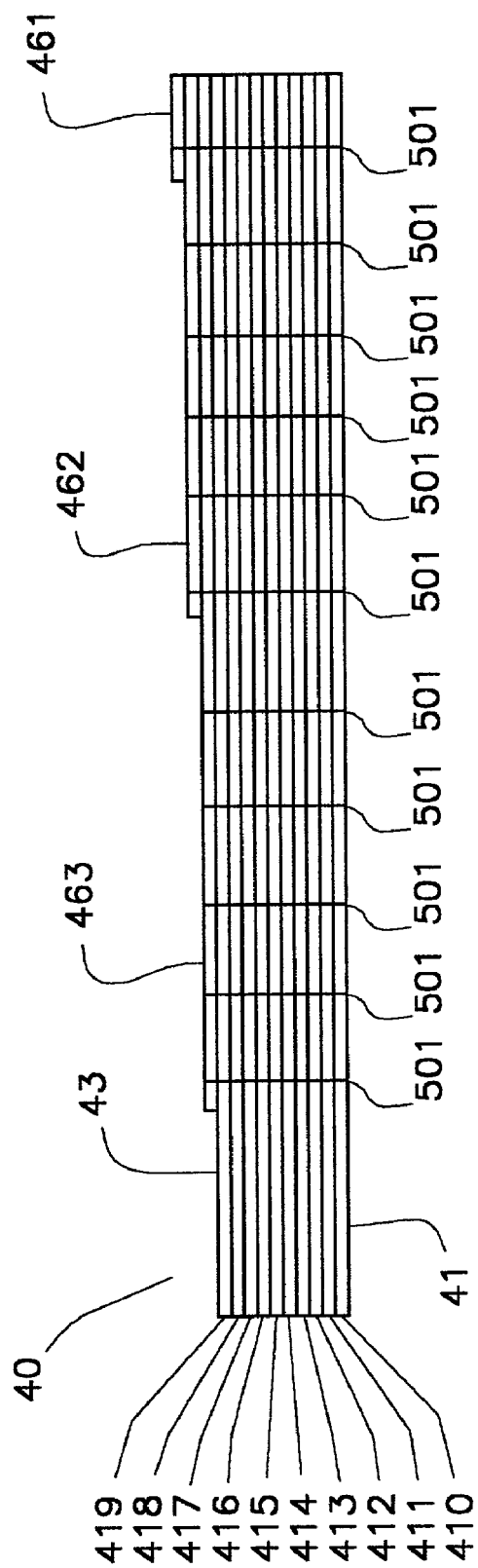
FIG. 4A shows layers of the assembled structural element of the embodiment of FIG. 4.

Another embodiment of the composite structure is illustrated by referring to FIG. 4 herein. The embodiment of FIG. 4 comprises a first member or face sheet 40 which comprises an outer surface 41, an inner surface 43, and a plurality of layers 410–419 therebetween. Layers 410–419 are shown in greater detail in FIG. 4A. As previously discussed, in one preferred embodiment the layers 410–419 are a composite material such as the graphite fiber/epoxy resin system previously described, and layers 410–419 are joined together by curing.

The embodiment of FIG. 4 also comprises a rib-receiving member engaged to the inner surface 43 of the first member or face sheet 40. The rib-receiving member comprises a rib-receiving sleeve 48 (shown here as a substantially U-shaped element). The sleeve 48 has an open end for receiving the first end 64 of the rib member 6, which is shown as a single member in FIG. 4 and which may be made up of a plurality of rib elements as described above with respect to FIG. 3. The sleeve 48 also has a closed curved end 49. First and second sleeve support members 46 and 47 are disposed on each side of sleeve 48. The first and second sleeve support members comprise outer layers 461 and 471, respectively, and preferably one or more inner layers 462, 463, 472, and 473. In one preferred embodiment, as depicted in FIG. 4, a plurality of anchoring elements 501 interconnect individual layers 410–419 of the first member. The first member or face sheet, the rib-receiving sleeve and the first and second sleeve support members as well as the rib member may be made from a composite material such as the graphite fiber/epoxy resin system previously described, which is penetrable by the anchoring elements 501.

The first and second sleeve support members 46 and 47, respectively comprising outer layers 461 and 471 and the inner layers 462, 463, 472, and 473, respectively are substantially symmetrically disposed on opposite sides of the substantially U-shaped rib-receiving sleeve 48. Inner layers 463 and 473 of the first and second sleeve support members contact the substantially U-shaped rib-receiving sleeve 48, as shown in FIG. 4.

Each of the substantially symmetrically disposed layers 461, 462, 463, 471, 472, and 473 is preferably formed by using a tool to provide curvature, as will be well understood by those skilled in the art. The rib-receiving sleeve 48 comprises substantially vertical ends 503 and 511. Preferably, the layers 461, 462, 463, 471, 472, and 473 also comprise substantially vertical ends. Preferably, ends 503 and 511 are situated at substantially the same vertical height as the substantially vertical ends of layers 461, 462, 463, 471, 472, and 473. In a preferred embodiment, first member or face sheet 40, sleeve support members 46 and 47, and rib-receiving sleeve 48 are cocured as previously described to form a rib-receiving assembly, where all of these individual components are made of a composite material such as the graphite fiber/epoxy resin system previously described.

In this embodiment of the invention, the curved portion 49 and the substantially vertical walls 50 and 51 define a substantially U-shaped groove. A rib member 6 which may be formed of a composite material or layers of a composite material is aligned with the substantially U-shaped groove. First end 64 of the rib member is inserted into the groove. Preferably, rib member 6 has a height greater than the depth of the groove, so that, as shown in FIG. 1, second end 62 of the rib member projects out of the rib-receiving member. The groove-rib engagement provides structural support between the rib-receiving member and the rib member 6. The groove of U-shaped sleeve 48 is sized and arranged to receive rib member 6. Preferably, a film adhesive, paste adhesive or other suitable adhesive may be interposed between rib member 6 and the groove for adhering the rib member 6 to the rib-receiving member comprising U-shaped sleeve 48.

In another embodiment of this invention, the rib member projects out from the rib-receiving member and may be used to engage another rib-receiving member to form a structure. FIGS. 5A and 5B illustrate side views of this embodiment of the invention. In FIG. 5A, a first rib-receiving assembly 404 as described above with respect to any of FIGS. 1–4 and the description provided herein comprises a first member 412 and a rib-receiving member 405, and a second rib-receiving assembly 504 as described above with respect to any of FIGS. 1–4 and the description provided herein comprises a second member 512 and a rib-receiving member 505. In the embodiment of this invention depicted in FIGS. 5A and 5B, each rib-receiving member 405, 505 comprises a plurality of rib-receiving elements (but not shown in detail in FIGS. 5A and 5B) as previously described, and each rib receiving member has machined or integrally formed grooves 40 and 50 therein, respectively. As shown in FIG. 5B, each of grooves 40 and 50 is aligned with a rib member 6 having ends 62 and 64 and edges 66 and 68. End 62 is inserted into groove 40 to form a structural element, in accordance with the illustrations in FIGS. 1–4. End 64 is then inserted into groove 50 to complete the structure.

Figure 6:
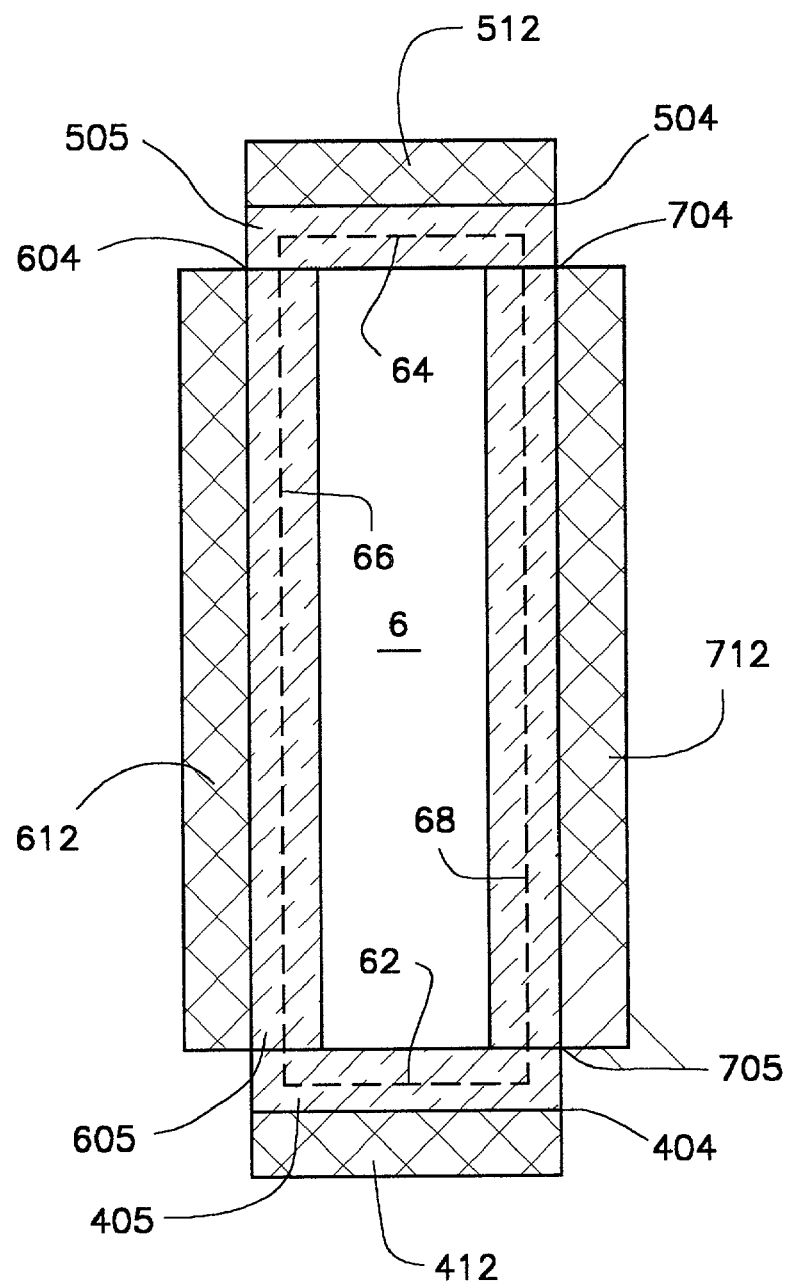
FIG. 6 shows a top view of a structure formed by engaging a rib member with four rib-receiving members.

Again referring to FIGS. 5A and 5B, in another embodiment of this invention rib ends 62 and 64 are engaged to first and second rib-receiving assemblies 404 and 504, respectively, as shown. Additionally, rib edge 66 may be engaged to a third rib-receiving assembly (not shown in FIGS. 5A and 5B) and rib edge 68 may be engaged to a fourth rib-receiving assembly (not shown in FIGS. 5A and 5B). The third and fourth rib-receiving assemblies have the structure of first and second rib-receiving assemblies 404 and 504. Such a design may be employed, for example, in an aircraft wing flap. FIG. 6 shows a forward view from point "A" in FIG. 5B of the embodiment of the structural element described herein in which rib ends 62 and 64 as well as rib edges 66 and 68 of rib 6 are engaged to rib receiving assemblies 404, 504, 604 and 704 in FIG. 6. More specifically, in FIG. 6, rib 6 has rib ends 62 and 64 and rib edges 66 and 68 (all shown as hidden edges). Rib end 62 engages rib receiving member 405 which is integral to first member or face sheet 412. Rib end 64 engages rib receiving member 505 which is integral to second member or face sheet 512. Rib edge 66 engages rib receiving member 605 which is integral to third member or face sheet 612. Rib edge 68 engages rib receiving member 705 which is integral to fourth member or face sheet 712. The rib-receiving assemblies 404, 504, 604, and 704 as depicted in FIG. 6 may be of the types depicted in any of FIGS. 1–5 described herein.

It should be understood that various changes and modifications to the preferred embodiments described herein will be apparent to those skilled in the art. Such changes and modifications can be made without departing from the spirit and scope of this invention and without diminishing its attendant advantages. It is therefore intended that such changes and modifications be covered by the appended claims.

We claim:

1. A structural element comprising:
   (a) a first member having an inner surface and an outer surface;
   (b) a rib member having a first end and a second end;
   (c) a first rib-receiving member integral to the inner surface of the first member, wherein the first rib-receiving member comprises a plurality of rib-receiving elements wherein the rib-receiving elements are arranged step-wise relative to each other to form the first rib-receiving member, the rib-receiving elements having engagement openings therein for receiving the first end of the rib member, and a plurality of cover sheets, with each cover sheet located external to the first member such that each cover sheet projects from the inner surface of the first member, each cover sheet having an inner surface and an engagement opening therein for receiving the first end of the rib member, and wherein the rib-receiving elements are stacked under the cover sheets, and at least one rib-receiving element has an outer surface which is integral to the inner surface of at least one cover sheet; and
   (d) at least one anchoring element interconnecting the rib-receiving elements of the first rib-receiving member.

2. The structural element of claim 1, wherein an adhesive is interposed between the first end of the rib member and the openings of the first rib-receiving member.

3. The structural element of claim 1, wherein the second end of the rib member projects out from the first rib-receiving member.

4. The structural element of claim 1, wherein the first rib-receiving member comprises a plurality or rib-receiving elements which are adjoined to each other using an adhesive.

5. The structural element of claim 1, wherein each opening is a groove which comprises inner surfaces, and the rib member has a width smaller than the width of each groove and is in contact with the inner surfaces of each groove.

6. The structural element of claim 1, wherein each rib-receiving element is formed from a composite material.

7. The structural element of claim 6, wherein each rib-receiving element comprises a plurality of layers, and each layer is formed from a composite material.

8. The structural element of claim 1, wherein each rib-receiving element is formed from a metal.

9. The structural element of claim 1, wherein the rib member comprises a plurality of rib elements, and each rib element is formed from a composite material.

10. The structural element of claim 1, wherein the rib member comprises a plurality of rib elements, and each rib element is formed from a metal.

11. The structural element of claim 1, further comprising:
   (e) a second member having an inner surface and an outer surface;
   (f) a second rib-receiving member integral to the inner surface of the second member, wherein the second rib-receiving member comprises a plurality of rib-receiving elements having openings therein for receiving the second end of the rib member and a plurality of cover sheets having openings therein for receiving the second end of the rib member; and
   (g) at least one anchoring element interconnecting the rib-receiving elements of the second rib-receiving member.

12. The structural element of claim 11, wherein the rib member comprises first and second edges perpendicular to the first and second ends of the rib member, and the structural element further comprises:
   (h) a third member having an inner surface and an outer surface;
   (i) a third rib-receiving member integral to the inner surface of the third member, wherein the third rib-receiving member comprises a plurality of rib-receiving elements having openings therein for receiving the first edge of the rib member and a plurality of cover sheets having openings therein for receiving the first edge of the rib member;
   (j) at least one anchoring element interconnecting the rib-receiving elements of the third rib-receiving member;
   (k) a fourth member having an inner surface and an outer surface;
   (l) a fourth rib-receiving member integral to the inner surface of the fourth member, wherein the fourth rib-receiving member comprises a plurality of rib-receiving elements having openings therein for receiving the second edge of the rib member and a plurality of cover sheets having openings therein for receiving the second edge of the rib member; and
   (m) at least one anchoring element interconnecting the rib-receiving elements of the fourth rib-receiving member.

13. The structural element of claim 1, wherein the rib-receiving elements are arranged perpendicular to the rib member.

14. A structural element comprising:
   (a) a first member having an inner surface and an outer surface;

(b) a rib member having a first end and a second end; and (c) a first rib-receiving member integral to the inner surface of the first member, wherein the first rib-receiving member comprises a first substantially U-shaped rib-receiving sleeve having an open first end for receiving the rib member and a closed second end which forms an apex, a first sleeve support member and a second sleeve support member, wherein the first and second sleeve support members are distinct from the first member, the first and second sleeve support members are each located on the inner surface of the first member on opposite sides of the first rib-receiving sleeve, the first and second sleeve support members each comprise a plurality of layers including an inner layer, the inner layers of the first and second sleeve support members each contact the first rib-receiving sleeve, and only the apex of the first rib-receiving sleeve contacts the inner surface of the first member.

15. The structural element of claim 14, wherein the first member comprises a plurality of layers, and at least one anchoring element interconnects the plurality of layers of the first member.

16. The structural element of claim 14, wherein an adhesive is interposed between the first rib-receiving sleeve and the rib member.

17. The structural element of claim 14, wherein the second end of the rib member projects out from the first rib-receiving member.

18. The structural element of claim 14, wherein the first rib-receiving member comprises a plurality of rib-receiving elements which are adjoined to each other using an adhesive.

19. The structural element of claim 14, wherein each opening is a groove which comprises inner surfaces, wherein the rib member has a width smaller than the width of each groove and is in contact with the inner surfaces of each groove.

20. The structural element of claim 14, wherein the first member, first rib-receiving sleeve and first and second sleeve support members are each formed from a composite material.

21. The structural element of claim 20, wherein the first member and first and second sleeve support members each comprise a plurality of layers, and each layer is formed from a composite material.

22. The structural element of claim 14, wherein the first member, rib-receiving sleeve and first and second sleeve support members are each formed from a metal.

23. The structural element of claim 14, wherein the first rib member comprises a plurality of rib elements, and each rib element is formed from a composite material.

24. The structural element of claim 14, wherein the first rib member comprises a plurality of rib elements, and each rib element is formed from a metal.

25. The structural element of claim 14, further comprising:

(d) a second member having an inner surface and an outer surface; and (e) a second rib-receiving member integral to the inner surface of the second member, wherein the second rib-receiving member comprises a second rib-receiving sleeve having an open end for receiving the rib member and a closed end, and two sleeve support members, wherein the sleeve support members are each located on the inner surface of the second member on opposite sides of the second rib-receiving sleeve.

26. The structural element of claim 25, wherein the rib member comprises first and second edges perpendicular to the first and second ends of the rib member, and the structural element further comprises:

(f) a third member having an inner surface and an outer surface;

(g) a third rib-receiving member integral to the inner surface of the third member, wherein the third rib-receiving member comprises a third rib-receiving sleeve having an open end for receiving the rib member and a closed end, and two sleeve support members, wherein the sleeve support members are each located on the inner surface of the third member and are disposed on opposite sides of the third rib-receiving sleeve;

(h) a fourth member having an inner surface and an outer surface; and (i) a fourth rib-receiving member integral to the inner surface of the fourth member, wherein the fourth rib-receiving member comprises a fourth rib-receiving sleeve having an open end for receiving the rib member and a closed end, and two sleeve support members, wherein the sleeve support members are each located on the inner surface of the fourth member and are disposed on opposite sides of the fourth rib-receiving sleeve.

* * * * *